United States Patent
Lee et al.

(10) Patent No.: US 9,301,086 B2
(45) Date of Patent: Mar. 29, 2016

(54) DATA TRANSMISSION SYSTEM AND METHOD FOR BLUETOOTH INTERFACE

(71) Applicant: ISSC Technologies Corp., Hsinchu (TW)

(72) Inventors: Chung-I Lee, Hsinchu County (TW); Hsin-Ling Chu, Hsinchu County (TW)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/340,576

(22) Filed: Jul. 25, 2014

(65) Prior Publication Data

US 2015/0296325 A1    Oct. 15, 2015

(30) Foreign Application Priority Data

Apr. 14, 2014  (TW) .............................. 103113559 A

(51) Int. Cl.
*H04W 4/00* (2009.01)
*H04W 8/22* (2009.01)

(52) U.S. Cl.
CPC .............. *H04W 4/008* (2013.01); *H04W 4/003* (2013.01); *H04W 8/22* (2013.01)

(58) Field of Classification Search
CPC ..... H04W 76/02; H04W 84/18; H04W 84/20; H04W 4/008; H04W 8/22; H04B 1/0483
See application file for complete search history.

(56) References Cited

U.S. PATENT DOCUMENTS

| | | | |
|---|---|---|---|
| 5,916,309 A | 6/1999 | Brown et al. | 710/52 |
| 8,291,273 B2 | 10/2012 | Naoe et al. | 714/748 |
| 9,083,679 B2 | 7/2015 | Teruyama | |
| 9,144,014 B2 * | 9/2015 | Kim | H04W 52/0209 |
| 2003/0099207 A1 | 5/2003 | Yamato | 370/280 |
| 2003/0163619 A1 | 8/2003 | Saito | 710/56 |

(Continued)

FOREIGN PATENT DOCUMENTS

| | | | | |
|---|---|---|---|---|
| CN | 1201194 A | 12/1998 | | B41J 29/38 |
| CN | 1375773 A | 10/2002 | | G06F 12/02 |
| CN | 1463114 A | 12/2003 | | H04L 7/00 |

(Continued)

OTHER PUBLICATIONS

Taiwan Office Action, Application No. 200518539, 7 pages.

*Primary Examiner* — Sujatha Sharma
(74) *Attorney, Agent, or Firm* — Slayden Grubert Beard PLLC

(57) ABSTRACT

A data transmission system and a data transmission method for a Bluetooth interface are provided. The data transmission system includes a central electronic apparatus and a peripheral electronic apparatus. The central electronic apparatus has a central Bluetooth module, and the peripheral electronic apparatus has a peripheral Bluetooth module. Some Bluetooth characteristic information are transmitted between the central Bluetooth module and the peripheral Bluetooth module, wherein the characteristic information indicates a plurality of pieces of buffer size information in the central and peripheral Bluetooth modules. The central and peripheral Bluetooth modules perform a data transmission operation therebetween based on the characteristic information through a central enable flag and a peripheral Bluetooth module enable flag respectively.

18 Claims, 3 Drawing Sheets

(56) References Cited

U.S. PATENT DOCUMENTS

| | | | |
|---|---|---|---|
| 2005/0027906 A1* | 2/2005 | Peterson | G06F 13/4059 710/52 |
| 2009/0049198 A1* | 2/2009 | Blinn | H04L 29/12066 709/245 |
| 2009/0172182 A1* | 7/2009 | Yoon | H04L 65/80 709/231 |
| 2009/0240832 A1* | 9/2009 | Miyama | H04L 49/90 709/234 |
| 2013/0170355 A1 | 7/2013 | Wang et al. | 370/235.1 |
| 2013/0315235 A1 | 11/2013 | Foo | 370/389 |

FOREIGN PATENT DOCUMENTS

| | | | |
|---|---|---|---|
| CN | 101964705 A | 2/2011 | H04L 1/00 |
| CN | 102075305 A | 5/2011 | H04L 1/16 |
| EP | 2538691 A2 | 12/2012 | H04N 21/274 |
| TW | 200518539 A | 6/2006 | H04L 29/02 |

* cited by examiner

DATA TRANSMISSION SYSTEM AND METHOD FOR BLUETOOTH INTERFACE

CROSS-REFERENCE TO RELATED APPLICATION

This application claims the priority benefit of Taiwan application serial no. 103113559, filed on Apr. 14, 2014. The entirety of the above-mentioned patent application is hereby incorporated by reference herein and made a part of this specification.

BACKGROUND OF THE INVENTION

1. Field of the Invention

The invention relates to a data transmission system and a data transmission method for a Bluetooth interface and particularly relates to a data transmission system and a data transmission method of a Bluetooth Generic Attribute Profile.

2. Description of Related Art

With the progress of the electronic technology, portable consumer electronic products have become important tools in our daily lives. Using portable electronic products for exchanging information is an important function. Therefore, how to provide a stable short range wireless data transmission system has become an important issue.

The Bluetooth interface transmission system is a very commonly used wireless transmission interface. However, according to the conventional technology in this field, no response mechanism is provided between two Bluetooth modules that transmit data to each other by Bluetooth Attribue Protocol Write Command and Handle Value Notification. For this reason, the reliability of data transmission between the Bluetooth modules is relatively low. For example, when Bluetooth modules are performing a high-speed data transmission operation therebetween, the central Bluetooth module continues transmitting data; however, once the buffer of the peripheral Bluetooth module is filled, unprocessed information in the peripheral Bluetooth module will be overwritten and disappear. As a result, the data transmission is unreliable.

SUMMARY OF THE INVENTION

The invention provides a Bluetooth Generic Attribute Profile data transmission system and a data transmission method of a Bluetooth interface for effectively improving the stability of data transmission of the Bluetooth interface in a high transmission speed operation.

The data transmission system for the Bluetooth interface of the invention includes a central electronic apparatus and a peripheral electronic apparatus. The central electronic apparatus includes a central Bluetooth Generic Attribute Profile transmission module (referred to as a central Bluetooth module hereinafter) while the peripheral electronic apparatus includes a peripheral Bluetooth Generic Attribute Profile transmission module (referred to as a peripheral Bluetooth module hereinafter). A transmitting and receiving operation of a plurality of pieces of characteristic information is performed between the central Bluetooth module and the peripheral Bluetooth module, wherein the characteristic information indicates a plurality of pieces of buffer size information in the central Bluetooth module and peripheral Bluetooth module. A data transmission operation is performed between the central Bluetooth module and the peripheral Bluetooth module based on the characteristic information through a central enable flag and a peripheral Bluetooth module enable flag respectively.

The data transmission method for the Bluetooth interface of the invention includes: performing a transmitting and receiving operation of a plurality of pieces of characteristic information between the central Bluetooth module of the central electronic apparatus and the peripheral Bluetooth module of the peripheral electronic apparatus, wherein the characteristic information indicates a plurality of pieces of buffer size information in the central Bluetooth module and the peripheral Bluetooth module; performing a data transmission operation between the central Bluetooth module and the peripheral Bluetooth module based on the characteristic information through the central enable flag and the peripheral Bluetooth module enable flag respectively.

Based on the above, according to the invention, the characteristic information is transmitted between the central Bluetooth module and the peripheral Bluetooth module and the characteristic information indicates the buffer size information in the central Bluetooth module and the peripheral Bluetooth module for the central Bluetooth module and the peripheral Bluetooth module to obtain the use states of the buffers of each other, so as to effectively control the size of the data that is to be transmitted when the data transmission operation is performed between the central Bluetooth module and the peripheral Bluetooth module, thereby achieving stable data transmission.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
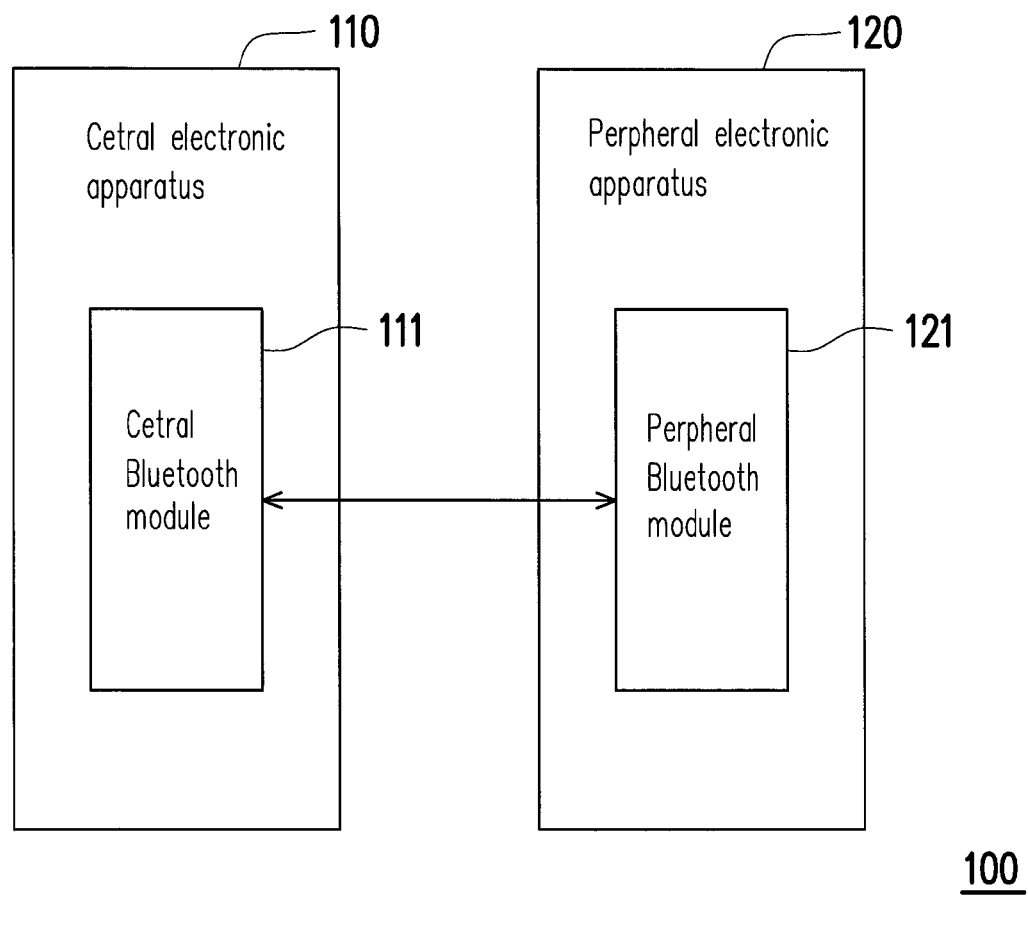
FIG. 1 is a schematic diagram illustrating a data transmission system for a Bluetooth interface according to an embodiment of the invention.

Hereinafter, please refer to FIG. 1. FIG. 1 is a schematic diagram illustrating a data transmission system for a Bluetooth interface according to an embodiment of the invention. A data transmission system 100 for a Bluetooth interface includes a central electronic apparatus 110 and a peripheral electronic apparatus 120. The central electronic apparatus 110 and the peripheral electronic apparatus 120 include a central Bluetooth module 111 and a peripheral Bluetooth module 112 respectively. The central Bluetooth module 111 is a central Bluetooth Generic Attribute Profile transmission module while the peripheral Bluetooth module 112 is a peripheral Bluetooth Generic Attribute Profile transmission module. When the central electronic apparatus 110 and the peripheral electronic apparatus 120 perform a data transmission operation there between, the central Bluetooth module 111 and the peripheral Bluetooth module 112 therein perform an exchange operation of exchanging a plurality of pieces of characteristic information. The characteristic information indicates buffer size information associated with the central Bluetooth module 111 and the peripheral Bluetooth module 112. More specifically, the characteristic information is utilized to record a use state of a buffer, used for temporarily storing data, respectively in the central Bluetooth module 111 and the peripheral Bluetooth module 112. Through the transmission operation of the characteristic information, the central Bluetooth module 111 notifies the peripheral Bluetooth module 112 of the use state of the buffer in the central Bluetooth module 111. Likewise, the peripheral Bluetooth module 112 notifies the central Bluetooth module 111 of the use state of the buffer in the peripheral Bluetooth module 112.

To be more specific, in an embodiment of the invention, the characteristic information respectively indicates a central Bluetooth module maximum receiving buffer size and a central returning buffer size of the central Bluetooth module 111 and a peripheral Bluetooth module maximum receiving buffer size and a peripheral Bluetooth module returning buffer size of the peripheral Bluetooth module 112. When the central Bluetooth module 111 performs a data writing operation on the peripheral Bluetooth module 112, the central Bluetooth module 111 receives the characteristic information, such as the peripheral Bluetooth module maximum receiving buffer size and the peripheral Bluetooth module returning buffer size, transmitted from the peripheral Bluetooth module 112. The central Bluetooth module 111 calculates a peripheral Bluetooth module permissible transmission data size according to the peripheral Bluetooth module maximum receiving buffer size, the peripheral Bluetooth module returning buffer size, and a central Bluetooth module transmitted data size. Here, the central Bluetooth module transmitted data size refers to a size of the data that the central Bluetooth module 111 transmits to the peripheral Bluetooth module 112 before this writing operation, and the peripheral Bluetooth module returning buffer size refers to a size of the buffer released by an application program in the peripheral Bluetooth module 112.

A central Bluetooth module permissible transmission data size=the peripheral Bluetooth module maximum receiving buffer size−the central Bluetooth module transmitted data size+the peripheral Bluetooth module returning buffer size.

On the other hand, when the peripheral Bluetooth module 112 performs a data writing operation on the central Bluetooth module 111, the peripheral Bluetooth module 112 receives the characteristic information, such as the central Bluetooth module maximum receiving buffer size and the central returning buffer size, transmitted from the central Bluetooth module 111. The peripheral Bluetooth module 112 calculates the central Bluetooth module permissible transmission data size according to the central Bluetooth module maximum receiving buffer size, the central returning buffer size, and a peripheral transmitted data size. Here, the peripheral transmitted data size refers to a size of the data that the peripheral Bluetooth module 112 transmits to the central Bluetooth module 111 before this writing operation, and the central returning buffer size refers to a size of the buffer released by an application program in the central Bluetooth module 111.

The peripheral Bluetooth module permissible transmission data size=the central Bluetooth module maximum receiving buffer size−the peripheral transmitted data size+the central returning buffer size.

On the other hand, in the data transmission system 100 of the Bluetooth interface of the invention, a control mechanism for enabling a flag is further included between the central Bluetooth module 111 and the peripheral Bluetooth module 112. The data transmission operation between the central Bluetooth module 111 and the peripheral Bluetooth module 112 is enabled by the enable flags respectively written into the central Bluetooth module 111 and the peripheral Bluetooth module 112.

To be more specific, when the central Bluetooth module 111 or the peripheral Bluetooth module 112 transmits data to the other side, in addition to obtaining the central Bluetooth module permissible transmission data size or the peripheral Bluetooth module permissible transmission data size, writing of the central enable flag or the peripheral Bluetooth module enable flag needs to be carried out so as to enable the subsequent data writing operation. The data writing operation may be a writing operation of general attribute profile (GATT) information. That is to say, before the central Bluetooth module 111 performs the data writing operation on the peripheral Bluetooth module 112, the central Bluetooth module 112 first calculates the peripheral Bluetooth module permissible transmission data size of the peripheral Bluetooth module 112 and performs writing of the peripheral Bluetooth module enable flag of the peripheral Bluetooth module 112 so as to enable the subsequent writing operation of the general attribute profile information. Moreover, according to the peripheral Bluetooth module permissible transmission data size, the central Bluetooth module 111 may select data smaller than or equal to the peripheral Bluetooth module permissible transmission data size for performing the writing operation, so as to ensure that the general attribute profile information written to the peripheral Bluetooth module 112 can be written to the buffer of the peripheral Bluetooth module 112. Accordingly, the data that has been stored in the buffer of the peripheral Bluetooth module 112 is not overwritten or removed and can be temporarily stored in the buffer of the peripheral Bluetooth module 112 for effective processing.

Similar to the above, before the peripheral Bluetooth module 112 performs the data writing operation on the central Bluetooth module 111, a notification operation of the data may be a notification operation of general attribute profile (GATT) information, and the peripheral Bluetooth module 112 first calculates the central Bluetooth module permissible transmission data size of the central Bluetooth module 111 and performs writing of the central enable flag of the central Bluetooth module 111 so as to enable the subsequent writing operation of the general attribute profile information. According to the central Bluetooth module permissible transmission data size, the peripheral Bluetooth module 112 may select data smaller than or equal to the central Bluetooth module permissible transmission data size for performing the writing operation, so as to ensure that the general attribute profile information written to the central Bluetooth module 111 can be written to the buffer of the central Bluetooth module 111. Accordingly, the data that has been stored in the buffer of the central Bluetooth module 111 is not overwritten or removed and can be temporarily stored in the buffer of the central Bluetooth module 111 for effective processing.

Also, it is noted that a characteristic of a central enable flag characteristic is notification or indication, and a characteristic of a peripheral Bluetooth module enable flag characteristic is writing or writing demand.

Figure 2:
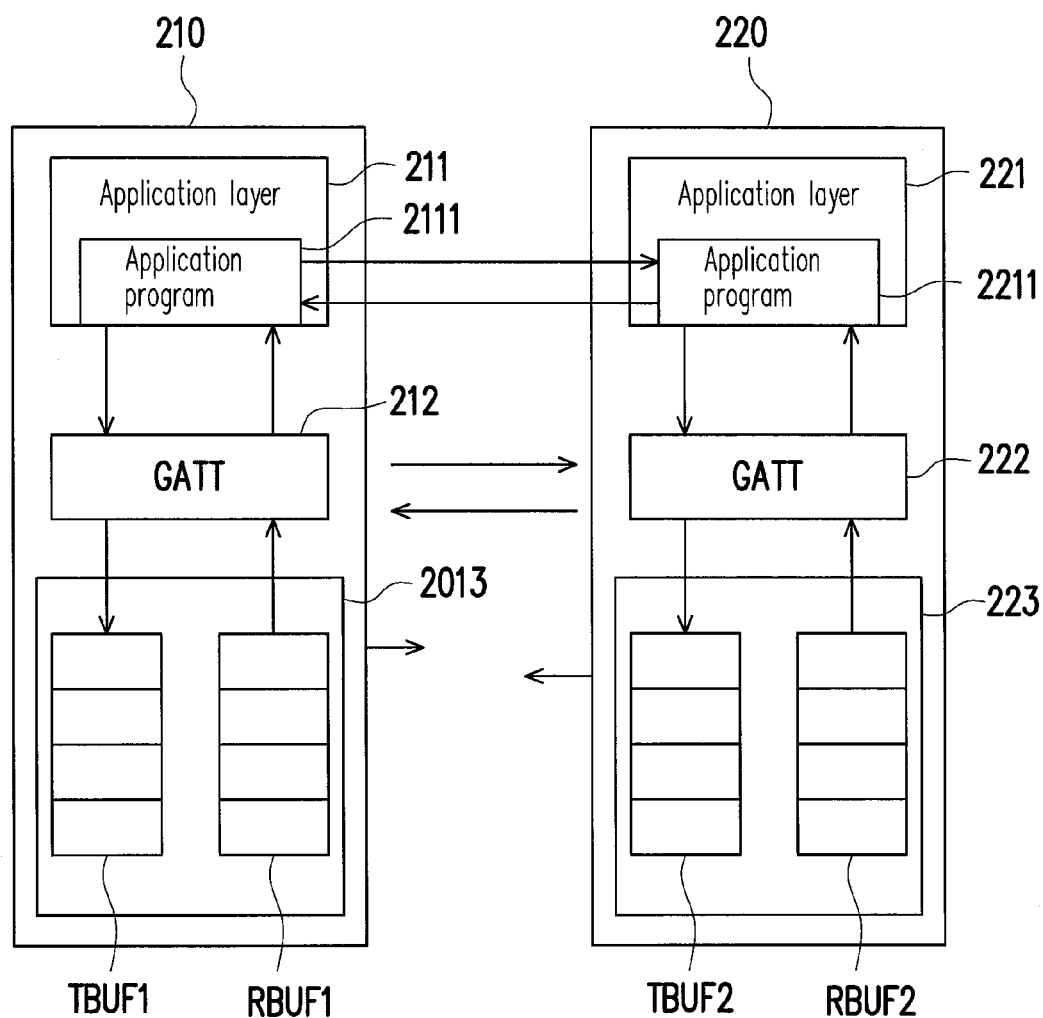
FIG. 2 is a schematic diagram illustrating a data transmission system for a Bluetooth interface according to an embodiment of the invention.

Hereinafter, please refer to FIG. 2. FIG. 2 is a schematic diagram illustrating a data transmission system for a Bluetooth interface according to an embodiment of the invention. A central Bluetooth module 210 and a peripheral Bluetooth module 220 perform a data transmission operation therebetween. The central Bluetooth module 210 is configured with an application layer 211 and a GATT 212 and is built with a Bluetooth controller 213. The Bluetooth controller 213 is built with a data transmitting buffer TBUF1 and a data receiving buffer RBUF1. Likewise, the peripheral Bluetooth module 220 is configured with an application layer 221 and a GATT 222 and is built with a Bluetooth controller 223. The Bluetooth controller 223 is built with a data transmitting buffer TBUF2 and a data receiving buffer RBUF2.

Regarding details of the operation, in a first data transmission operation, the peripheral Bluetooth module returning buffer size and the central Bluetooth module transmitted data size may be deemed equal to 0. The central Bluetooth module 210 reads the characteristic information of the peripheral Bluetooth module maximum receiving buffer size through an application program 2111 in the application layer 211 and performs writing of the peripheral Bluetooth module enable flag to enable the writing operation on the peripheral Bluetooth module 220. The peripheral Bluetooth module 220 responds to a reading demand of the central Bluetooth module 210 for the characteristic information of the peripheral Bluetooth module maximum receiving buffer size and transmits the characteristic information of the peripheral Bluetooth module maximum receiving buffer size to the central Bluetooth module 210. The central Bluetooth module 210 calculates the peripheral Bluetooth module permissible transmission data size according to the peripheral Bluetooth module maximum receiving buffer size (the peripheral Bluetooth module maximum receiving buffer size is equal to the peripheral Bluetooth module permissible transmission data size).

After calculating the peripheral Bluetooth module permissible transmission data size, the central Bluetooth module 210 notifies the GATT 212 of the data size that is permissible to be written to the peripheral Bluetooth module 220 through the application program 2111 and then transmits GATT information having a proper size (smaller than the peripheral Bluetooth module permissible transmission data size) to the data transmitting buffer TBUF1 of the Bluetooth controller 213 to be temporarily stored through a transmission buffer memory disposed in the GATT 212. Next, the Bluetooth controller 213 sequentially transmits the general attribute profile information that is to be transmitted in the data transmitting buffer TBUF1 to the data receiving buffer RBUF2 of the peripheral Bluetooth module 220 in accordance with a Bluetooth communication protocol to serve as received general attribute profile information.

In the peripheral Bluetooth module 220, the Bluetooth controller 223 uploads the received general attribute profile information in the data receiving buffer RBUF2 to the GATT 222 such that the GATT 222 transmits the received general attribute profile information to the application layer 221 to be processed by the application program 2211.

When the application program 2211 processes the received general attribute profile information, the data receiving buffer RBUF2 occupied by part of or all of the received general attribute profile information that has been processed may be returned. Therefore, the application program 2211 calculates the peripheral Bluetooth module returning buffer size and transmits the peripheral Bluetooth module returning buffer size to the data transmitting buffer TBUF2 of the Bluetooth controller 223 through the GATT 222 to serve as general attribute profile information to be transmitted.

Next, the Bluetooth controller 223 transmits the general attribute profile information to be transmitted (the peripheral Bluetooth module returning buffer size) in the data transmitting buffer TBUF2 to the data receiving buffer RBUF1 of the central Bluetooth module 210 in accordance with the Bluetooth communication protocol to serve as received general attribute profile information in the data receiving buffer RBUF1.

Further to the above, the central Bluetooth module 210 may update the peripheral Bluetooth module permissible transmission data size according to the peripheral Bluetooth module maximum receiving buffer size, the peripheral Bluetooth module returning buffer size, and the central Bluetooth module transmitted data size that has been transmitted to the peripheral Bluetooth module 220 for performing the next data transmission operation.

In addition, it is noted that, when the central Bluetooth module 210 performs writing of the peripheral Bluetooth module enable flag to enable the writing operation on the peripheral Bluetooth module 220, the peripheral Bluetooth module 220 may generate a writing response signal and transmits the writing response signal to the central Bluetooth module 210 to notify the central Bluetooth module 210 that the writing operation can be performed. The central Bluetooth module 210 may carry out the next data transmission operation based on the above.

On the other hand, the peripheral Bluetooth module 220 may also transmit data to the central Bluetooth module 210. Details thereof are similar to those of the above embodiments and thus will not be repeated hereinafter.

Figure 3:
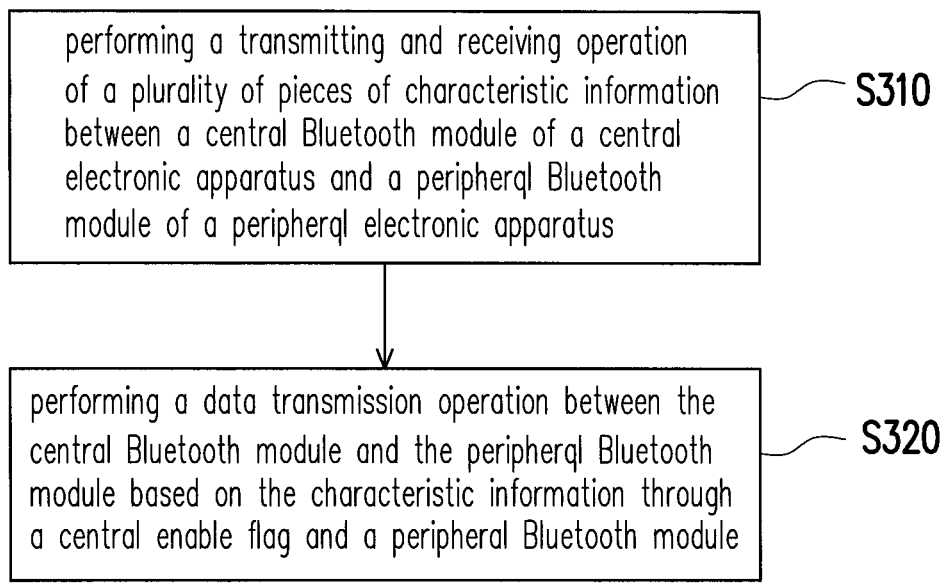
FIG. 3 is a flowchart of a data transmission method for a Bluetooth interface according to an embodiment of the invention.

Please refer to FIG. 3. FIG. 3 is a flowchart of a data transmission method for a Bluetooth interface according to an embodiment of the invention. In Step S310, a transmitting and receiving operation of a plurality of pieces of characteristic information is performed through a central Bluetooth module of a central electronic apparatus and a peripheral Bluetooth module of a peripheral electronic apparatus, wherein the characteristic information indicates a plurality of pieces of buffer size information in the central Bluetooth module and the peripheral Bluetooth module; and in Step S320, a data transmission operation is performed between the central Bluetooth module and the peripheral Bluetooth module based on the characteristic information through a central enable flag and a peripheral Bluetooth module enable flag respectively.

Details of the data transmission have been specified in the embodiments of FIG. 1 and FIG. 2 and thus will not be repeated hereinafter.

To sum up, according to the invention, the characteristic information is transmitted between the central Bluetooth module and the peripheral Bluetooth module and the characteristic information indicates the buffer size information in the central Bluetooth module and the peripheral Bluetooth module for calculating the use states of the buffers, so as to effectively control the size of the data that is to be transmitted when the data transmission operation is performed between the central Bluetooth module and the peripheral Bluetooth module. Thus, the risks, such as the transmitted data is too large to be stored or unprocessed data in the buffer is overwritten, are prevented. Accordingly, the efficiency and stability of the data transmission are significantly improved.

What is claimed is:

1. A data transmission system of a Bluetooth interface, the data transmission system comprising:
 a central electronic apparatus comprising a central Bluetooth module; and
 a peripheral electronic apparatus comprising a peripheral Bluetooth module,
 wherein a transmitting and receiving operation of a plurality of characteristic information is performed between the central Bluetooth module and the peripheral Bluetooth module, wherein the characteristic information indicates a plurality of buffer size information in the central Bluetooth module and the peripheral Bluetooth module, and a data transmission operation is performed between the central Bluetooth module and the peripheral Bluetooth module based on the characteristic information through a central enable flag and a peripheral Bluetooth module enable flag respectively.

2. The data transmission system according to claim 1, wherein the characteristic information respectively indicates a central Bluetooth module maximum receiving buffer size and a central returning buffer size of the central Bluetooth module, and a peripheral Bluetooth module maximum receiving buffer size and a peripheral Bluetooth module returning buffer size of the peripheral Bluetooth module.

3. The data transmission system according to claim 2, wherein the central Bluetooth module obtains a peripheral Bluetooth module permissible transmission data size of the peripheral Bluetooth module according to the peripheral Bluetooth module maximum receiving buffer size, the peripheral Bluetooth module returning buffer size, and a central Bluetooth module transmitted data size.

4. The data transmission system according to claim 3, wherein the central Bluetooth module permissible transmission data size=the peripheral Bluetooth module maximum receiving buffer size−the central Bluetooth module transmitted data size+the peripheral Bluetooth module returning buffer size.

5. The data transmission system according to claim 2, wherein the peripheral Bluetooth module obtains a central Bluetooth module permissible transmission data size of the central Bluetooth module according to the central Bluetooth module maximum receiving buffer size, the central returning buffer size, and a peripheral transmitted data size.

6. The data transmission system according to claim 5, wherein the peripheral Bluetooth module permissible transmission data size=the central Bluetooth module maximum receiving buffer size−the peripheral Bluetooth module transmitted data size+the central returning buffer size.

7. The data transmission system according to claim 1, wherein the central enable flag comprises a central writing flag and a central writing demand flag, and the peripheral Bluetooth module enable flag comprises a peripheral writing flag and a peripheral writing demand flag.

8. The data transmission system according to claim 1, wherein each of the central Bluetooth module and the peripheral Bluetooth module comprises:
 a Bluetooth controller comprising a data transmitting buffer and a data receiving buffer, wherein the data transmitting buffer is configured to temporarily store general attribute profile information to be transmitted and the data receiving buffer is configured to temporarily receive received general attribute profile information.

9. The data transmission system according to claim 1, wherein the central Bluetooth module executes a central application program to perform a transmission operation of a first portion of the characteristic information, and the peripheral Bluetooth module executes a peripheral application program to perform a transmission operation of a second portion of the characteristic information.

10. The data transmission system according to claim 8, wherein the central Bluetooth module sets the peripheral Bluetooth module enable flag through the central application program, and the peripheral Bluetooth module sets the central enable flag through the peripheral Bluetooth module application program.

11. A data transmission method of a Bluetooth interface, the data transmission method comprising:
 performing a transmitting and receiving operation of a plurality of pieces of characteristic information between a central Bluetooth module in a central electronic apparatus and a peripheral Bluetooth module in a peripheral electronic apparatus, wherein the characteristic information indicates a plurality of pieces of buffer size information in the central Bluetooth module and the peripheral Bluetooth module; and
 performing a data transmission operation between the central Bluetooth module and the peripheral Bluetooth module based on the characteristic information through a central enable flag and a peripheral Bluetooth module enable flag.

12. The data transmission method according to claim 11, wherein the characteristic information respectively indicates a central Bluetooth module maximum receiving buffer size and a central returning buffer size of the central Bluetooth module, and a peripheral Bluetooth module maximum receiving buffer size and a peripheral Bluetooth module returning buffer size of the peripheral Bluetooth module.

13. The data transmission method according to claim 12, wherein the step of performing the data transmission operation between the central Bluetooth module and the peripheral Bluetooth module based on the characteristic information through the central enable flag and the peripheral Bluetooth module enable flag comprises:
 obtaining a peripheral Bluetooth module permissible transmission data size of the peripheral Bluetooth module according to the peripheral Bluetooth module maximum receiving buffer size, the peripheral Bluetooth module returning buffer size, and a central Bluetooth module transmitted data size.

14. The data transmission method according to claim 13, wherein the central Bluetooth module permissible transmission data size=the peripheral Bluetooth module maximum receiving buffer size−the central Bluetooth module transmitted data size+the peripheral Bluetooth module returning buffer size.

15. The data transmission method according to claim 12, wherein the step of performing the data transmission operation between the central Bluetooth module and the peripheral Bluetooth module based on the characteristic information through the central enable flag and the peripheral Bluetooth module enable flag comprises:
 obtaining a central Bluetooth module permissible transmission data size of the central Bluetooth module according to the central Bluetooth module maximum receiving buffer size, the central returning buffer size, and a peripheral transmitted data size.

16. The data transmission method according to claim 15, wherein the peripheral Bluetooth module permissible transmission data size=the central Bluetooth module maximum receiving buffer size−the peripheral Bluetooth module transmitted data size+the central returning buffer size.

17. The data transmission method according to claim 11, wherein the step of performing the transmitting and receiving operation of the characteristic information between the central Bluetooth module in the central electronic apparatus and the peripheral Bluetooth module in the peripheral electronic apparatus comprises:
 executing a central application program to perform a transmission operation of a first portion of the characteristic information; and executing a peripheral application program to perform a transmission operation of a second portion of the characteristic information.

18. The data transmission method according to claim 17, further comprising:
providing the central Bluetooth module to set the peripheral Bluetooth module enable flag through the central application program; and
providing the peripheral Bluetooth module to set the central enable flag through the peripheral application program.

* * * * *